April 26, 1960
J. C. KINLEY
2,933,819
INTERNAL PIPE CALIPERING TOOLS
Original Filed June 12, 1952
5 Sheets-Sheet 1
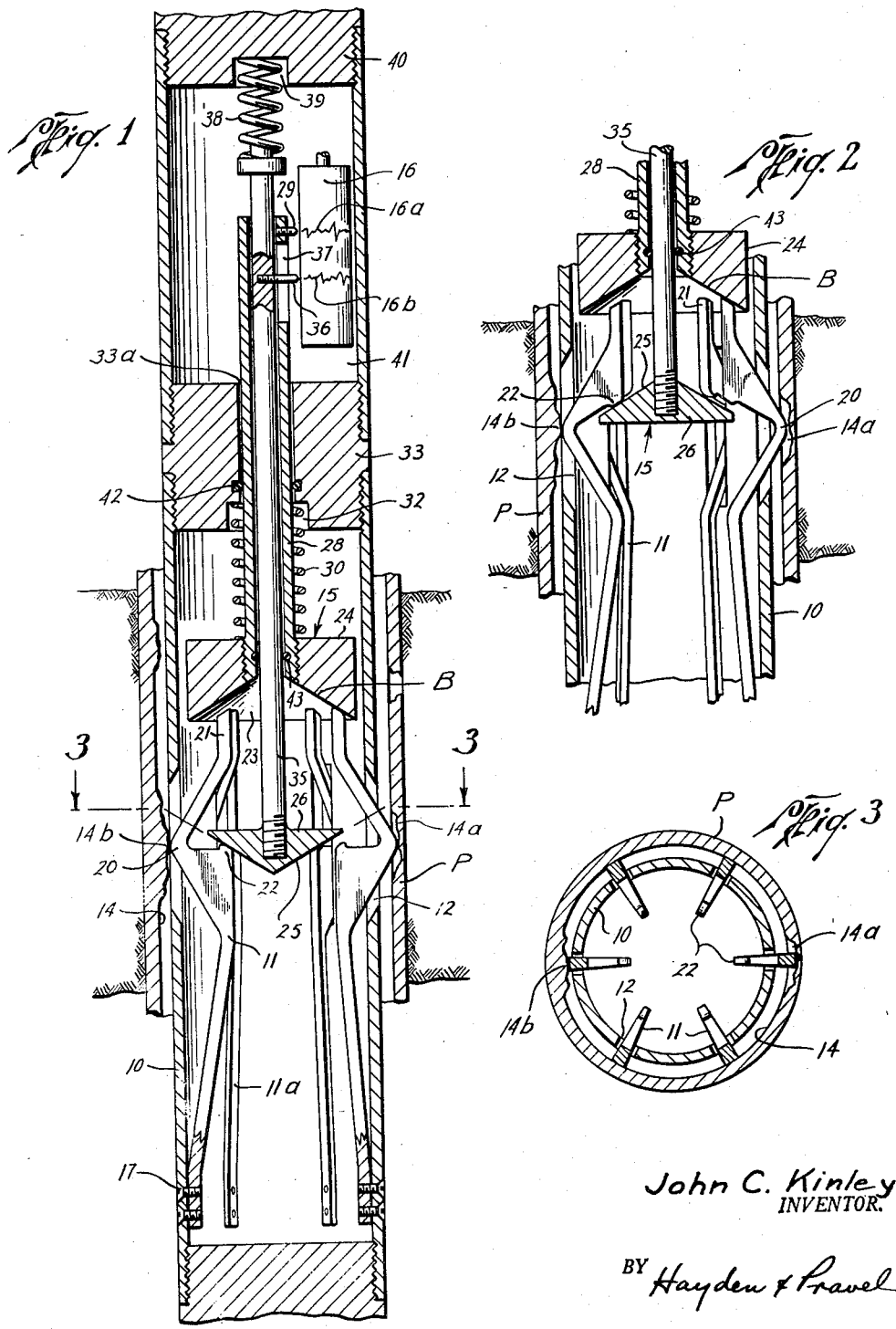
John C. Kinley
INVENTOR.
BY Hayden & Pravel
ATTORNEYS

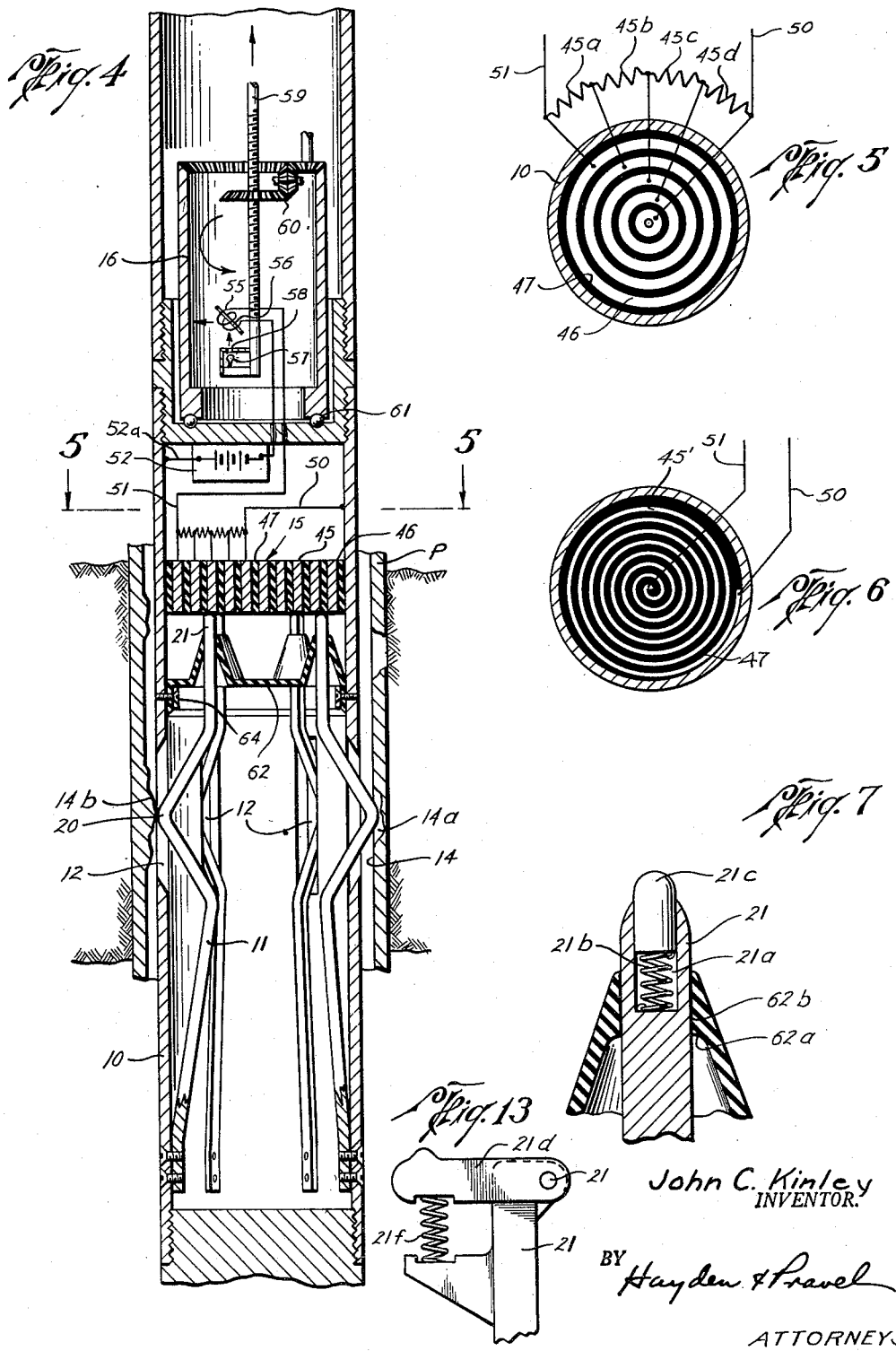

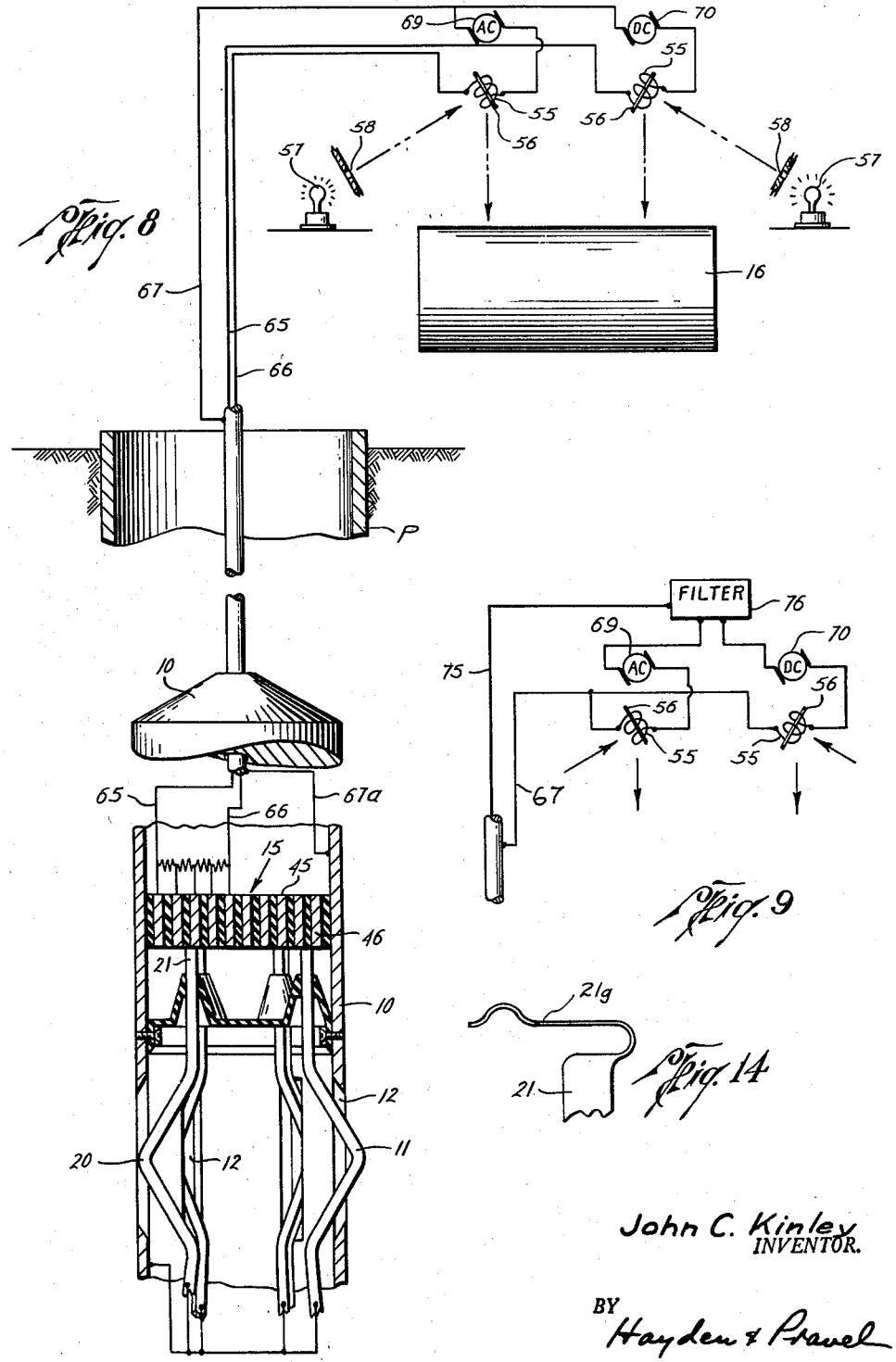

April 26, 1960 J. C. KINLEY 2,933,819
INTERNAL PIPE CALIPERING TOOLS
Original Filed June 12, 1952 5 Sheets-Sheet 4
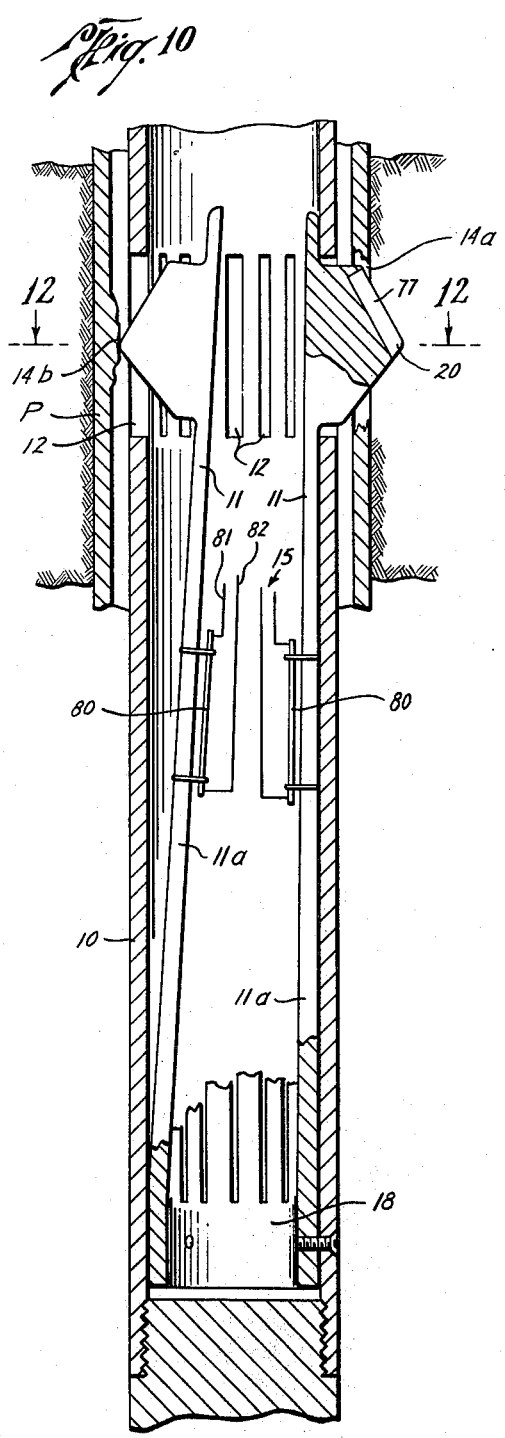
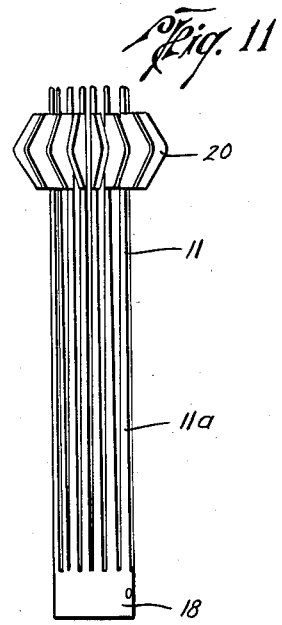
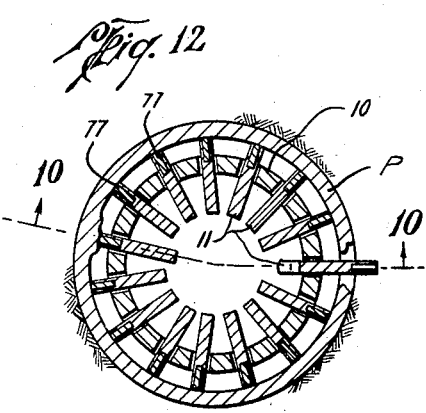
John C. Kinley
INVENTOR.
BY Hayden & Pravel
ATTORNEYS

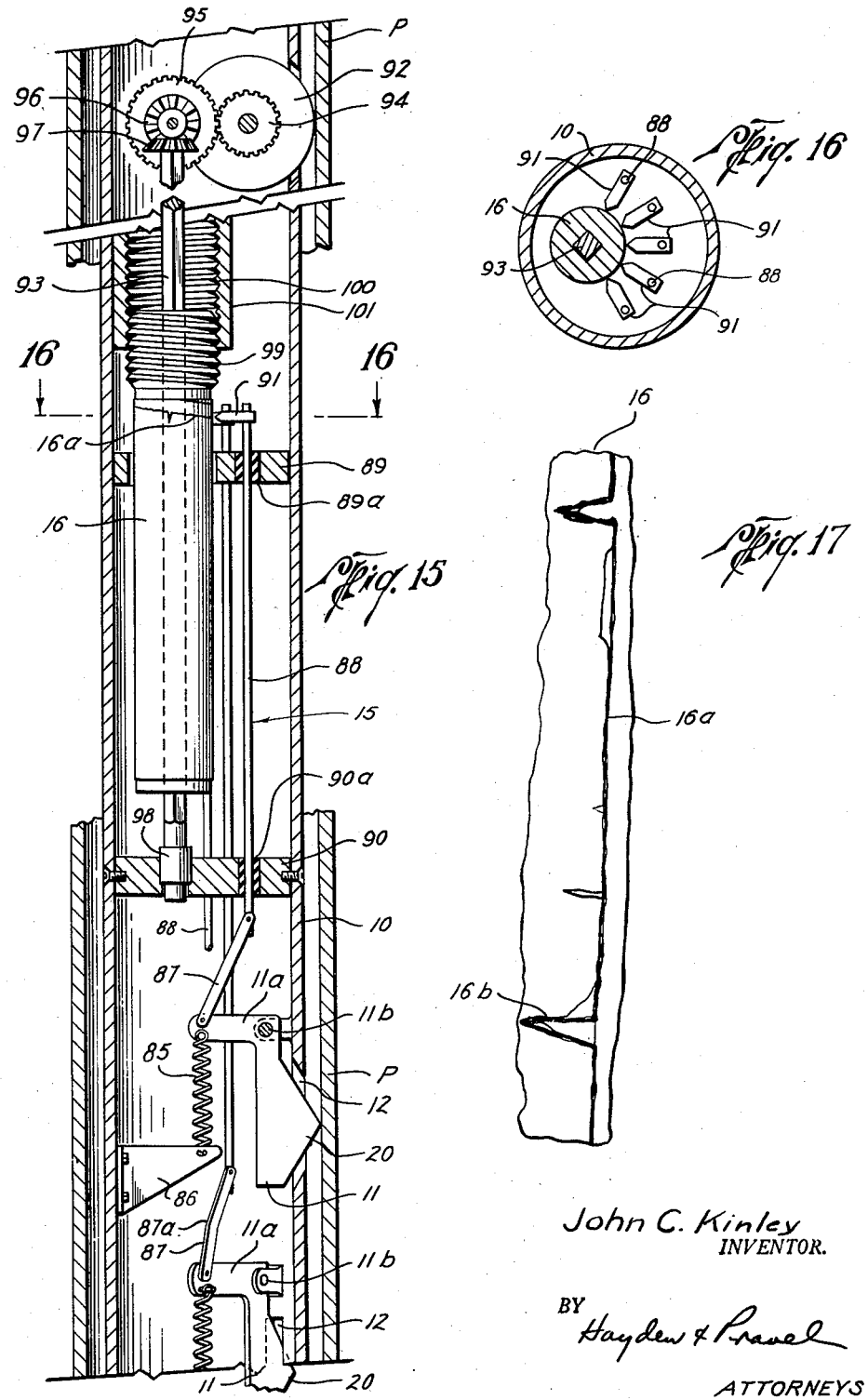

United States Patent Office 2,933,819
Patented Apr. 26, 1960

2,933,819

INTERNAL PIPE CALIPERING TOOLS

John C. Kinley, Houston, Tex., assignor of one-half to Myron M. Kinley, Los Angeles, Calif.

Original application June 12, 1952, Serial No. 294,653, now Patent No. 2,771,685, dated November 27, 1956. Divided and this application October 1, 1956, Serial No. 613,248

4 Claims. (Cl. 33—178)

This invention relates to new and useful improvements in calipering tools, and particularly to calipering tools for locating and recording the surface variation in a pipe such as used in a well.

This application is a division of my copending U.S. application, Serial No. 294,653, filed June 12, 1952, now issued as U.S. Patent No. 2,771,685, and is entitled to the filing date thereof as to all common subject matter.

In the calipering of pipe such as well pipe which is disposed within a well bore, the calipering tool is placed in the pipe and is moved longitudinally therein to obtain a record of the surface variations throughout the length of the pipe. From the record obtained in calipering the pipe, an indication is obtained as to the condition of the pipe throughout its length. The information generally desired on such a record is whether corrosion or other factors have so reduced or changed the wall thickness of the pipe that it is subject to failure. Information is of value as to the presence of scale, flattening of the pipe due to excessive tong pressure, and similar causes for a pipe being out of round. In the past, one type of calipering tool utilized a plurality of feelers with a separate chart for each feeler, which required that the separate charts had to be compared after the records were obtained in order to determine the characteristics of the well pipe surface. Other calipering tools used in the past measured only the deepest pit encountered in the pipe at any given point throughout its length; such deepest pit encountered was indicated on a chart by the movements of the single feeler entering therein, and such indication was transmitted by mechanical means to the chart. In none of the previously used tools was the deepest pit recorded on a chart by transmission of the feeler movement through an electrical circuit.

In many instances, it becomes desirable to compare the deepest pit encountered at a given point with the uncorroded or least corroded portion of the pipe encountered at the same point. When such information is co-ordinated on a chart, the distance between the record lies for the deepest pit and that for the uncorroded portion will indicate the amount of actual corrosion regardless of the actual original I.D. of the pipe. Inasmuch as uncorroded pipe is comparatively smooth it is generally represented by a comparatively straight line which is easily distinguishable from, and will normally appear adjacent to areas of ring corrosion, where there is no uncorroded point encountered. Furthermore, such a coordinated record would pemit differentiation between deep corrosion, or holes, and collars connecting lengths of pipe such as used in oil wells and the like, which information is generally unobtainable when merely recording the deepest pit. Many wells are cased without any record being made of the lengths of the individual joints of casing so that it is impossible to tell whether a big deflection on a record of only the deepest pits encountered indicates a deep pit or hole or merely a joint in the casing. When all of the feelers go out into the collar of such a joint a record of the movement of the least extended feeler used in conjunction with this record will show that it too went out, showing the presence of a collar. If it had not moved, a deep pit or hole would be indicated.

It is therefore one object of this invention to provide a calipering tool wherein the deepest pit encountered at a given point in a length of pipe can be determined or recorded by electrical means.

It is another object of this invention to provide a calipering tool wherein detection of cement, tong marks, scale, welds or other inward projections is obtained by recording the furthest inward feeler displacement.

Another important object of this invention is to provide a calipering tool in which not only the deepest pit encountered is recorded at each given point throughout the pipe, but also the uncorroded pipe or point of least corrosion encountered thereon is recorded throughout the length of the pipe, whereby a coordinated record on a chart may be obtained so that the actual corrosion of the pipe at any given point can be determined.

It is another object of this invention to provide a tool for measuring variations in the inside surface of a pipe, wherein strain gauges are utilized on feeler members to enable a record to be made of the feeler movement through an electrical circuit to a recording means.

Another object of this invention is to provide a calipering tool for locating variations on the inside surface of the pipe, which tool includes independently movable feelers for contacting the inside surface of the pipe, and means for transmitting and recording a pair of lines on a chart indicating the furthest outward feeler and the furthest inward feeler at each given point throughout the length of the pipe.

A still further object of this invention is to provide a tool for calipering the inside surface of a pipe, which tool includes independently movable feelers which contact the inside surface of the pipe, and two reciprocal members within the tool adapted to contact at any given instant at least two of the feelers, with one of the reciprocal members transmitting a record of the furthest inward feeler, and another of the reciprocal members transmitting a record of the furthest outward feeler.

Another object of this invention is to provide a tool for calipering the inside surface of a pipe, in which a plurality of circumferentially spaced feelers are disposed within the tool and are adapted to contact a variable resistance member which is connected in an electrical circuit, whereby the furthest outward feeler and the furthest inward feeler will transmit a record through the electrical circuit by varying the resistance in the resistance means.

A still further object of this invention is to provide a well caliper tool wherein a plurality of feelers are spaced axially as well as circumferentially, and a record is obtained from the movement of such feelers which indicates the furthest outward and furthest inward feelers at any one lateral plane in the pipe being calipered.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a longitudinal sectional view of one form of the calipering tool of this invention wherein the furthest outward feeler and the furthest inward feeler are constructed to mechanically transmit a record to a chart where they are coordinated for determining the actual corrosion in the pipe.

Figure 2 is a partial sectional view of the calipering tool of this invention, illustrating a modified form of the tool illustrated in Figure 1.

Figure 3 is a horizontal sectional view of the tool of Figure 1 taken on line 3—3 of Figure 1.

Figure 4 is a longitudinal sectional view of another form of the caliper tool of this invention wherein either the furthest inward or the furthest outward feeler transmits through an electrical circuit a record of the variation in the inside surface of the well pipe.

Figure 5 is a horizontal sectional view taken on line 5—5 of Figure 4.

Figure 6 is a horizontal sectional view illustrating a modified resistance means from that shown in Figures 4 and 5.

Figure 7 is a sectional view illustrating one form of contact finger which may be utilized in the device shown in Figures 4 and 8 particularly.

Figure 8 is another modification of the calipering tool of this invention wherein the furthest outward feeler and the furthest inward feeler can both be recorded on the same chart by varying the resistance of a resistance means in an electrical circuit connected to the recorder means.

Figure 9 is a modified form of the circuit utilized in the modification of Figure 8, and illustrates in particular the use of a single wire or cable leading to the resistance means of the electrical circuit.

Figure 10 is another form of the caliper tool of this invention wherein the feelers have mounted therewith strain gauges which are connected in an electrical circuit for recording the movement of the feelers.

Figure 11 is an elevational view illustrating an alternate spring cluster feeler structure which might be utilized in any embodiment of this invention.

Figure 12 is a horizontal sectional view taken on line 12—12 of Figure 10.

Figure 13 is a view illustrating a modified contact finger.

Figure 14 is a view illustrating another modified contact finger.

Figure 15 is a view, partly in elevation and partly in section, illustrating a modified form of the invention wherein the feelers are spaced circumferentially and axially from each other.

Figure 16 is a horizontal sectional view taken on line 16—16 of Figure 15 and illustrates the preferred arrangement of the styluses and chart.

Figure 17 is a fragmentary enlarged view of the chart of Figure 15, and illustrates the type of record obtained with the modifications of Figures 10 and 15.

In the drawings, the numeral 10 designates a support housing of the calipering tool of this invention, which is adapted to be placed within a pipe such as indicated at P. In the normal calipering operation, the tool is moved throughout the length of the pipe in order to locate the surface variations therein. Mounted on the support housing are a plurality or a multiplicity of circumferentially spaced feelers 11 which are independently movable with respect to each other. These feelers 11 are adapted to extend through openings 12 in the support housing 10 whereby the feelers 11 contact the inside surface 14 of the pipe P and are thereby laterally moved upon contact with pits or depressions 14a or raised portions or protuberances 14b. The radial or lateral movement of these feelers 11 in accordance with the surface variations on the inside surface 14 of the pipe P is transmitted through a transmitting means 15 to a recording means 16.

Referring now to Figure 1 particularly, it can be seen that at the lower portion of the arms 11a of the feelers 11 they are connected to the support housing 10 by screws 17 or any other equivalent securing means. In some instances, the lower ends of the arms 11a may be formed in an integral ring such as 18 shown in Figure 11 whereby the feelers 11 are assembled in a feeler cluster. The arms 11a are of resilient material and tend to urge the feelers 11 outwardly through the openings 12 so that a contact with the inside surface 14 of the pipe P is assured at all times. As can be seen in Figure 1, the upper portion of the feelers 11 is formed with an extension which is angularly shaped having inclined faces merging at a relatively sharp line contact portion 20. It is these contact portions 20 on the fingers which contact the inner surface 14 of the pipe P. On the feelers 11, inwardly of the projections or contacts 20, are formed fingers 21 and 22 which are spaced from each other, with the terminal fingers 21 adapted to contact the tapered surface 23 of a concave reciprocal member 24, while the intermediate fingers 22 are adapted to contact the downwardly convex tapered surface 25 of another reciprocal member 26.

The concave reciprocal member 24 is secured to the lowered end of a tubular member 28. This tubular member 28 has a needle or stylus 29 mounted at its upper end for making a record on the recorder means or chart 16. The reciprocal member 24 and the tubular member 28 connected therewith are normally urged downwardly by the action of a spring 30 which is engaged with the upper surface of the reciprocal member 24 and fits within a recess 32 in a plug or stop means 33 mounted in the housing 10. The plug 33 has a passage 33a therethrough in which the tubular member 28 can reciprocate. The convex reciprocal member 26 is connected with the lower end of a rod or tube 35 which passes concentrically within the tubular member 28. This rod 35 also has a stylus 36 thereon which projects through an opening 37 in the tubular member 28 to trace a line on the chart 16. The rod 35 is normally urged downwardly by the spring 38 engaging the top portion thereof and mounted within a recess 39 in plug 40.

The spring 30 is of lesser strength than the spring arms 11a of the feelers 11, so that the feelers 11 when moving laterally in movement throughout the length of the pipe, are capable of urging the reciprocal member 24 upwardly against the action of the spring 30. The spring 38 need be merely strong enough to maintain contact between the furthest inward finger 22 and the convex tapered surface 25 of the reciprocal member 26. As can be seen the spring 38 does not have to overcome the resilience of the spring arms 11a because any inward movement of the arm is effected positively by engagement with a solid protuberance and therefore spring 38 may be of greater or less strength than such spring arms.

It is desirable to prevent the well fluids from passing upwardly into the section 41 in which the chart 16 is inclosed. To this end, seal rings are provided, with one of these seal rings 42 being positioned between the outer surface of the tubular member 28 and the passage 33a of the plug 33. The other of the seal rings 43 is mounted between the tube or rod 35 and the inside surface of the tubular member 28. The chart 16 is the recorder means and may be of cylindrical shape and adapted to be rotated and simultaneously moved longitudinally during the longitudinal movement of the calipering tool throughout the length of pipe P. The means for movements of this chart 16 have not been shown but various well known means could be used, an example of which is shown in U.S. Patent No. 2,665,187, issued January 5, 1954. This chart 16 could also be rotated by a spring actuated device such as shown in the U.S. Patent to M. M. Kinley, bearing Patent No. 2,102,080, granted December 14, 1937. Other recording means than the cylindrical chart 16 could also be used, examples of which are the strip recording means disclosed in U.S. Patent 2,544,609, issued to McMahan on March 6, 1951, and the electrical indicating device as set forth in the patent to M. M. Kinley and J. C. Kinley, No. 2,638,681, issued May 19, 1953.

In the operation of the calipering tool of this invention as shown in Figure 1, the tool is moved longitudinally in the pipe P by a suitable means such as a wire line or other known devices, not shown. As the tool is moved throughout the length of the pipe P, the feelers 11 at their points 20 are in contact constantly with the inside surface of the pipe P. Since the inside surface 14 varies in accordance with the pits 14a and the raised portions 14b, the feelers 11 will be subjected to lateral movement throughout the raising or lowering of the tool in the pipe P. There are preferably a large number of the feelers 11 used in the tool of this invention so that an accurate indication of the surface variations may be obtained, although it will be appreciated that a record of the furthest inward and the furthest outward feelers could be obtained with just two such feelers 11. In a perfectly circular smooth pipe, the terminal fingers 21 would all be in contact with the concave tapered surface 23 of the reciprocal member 24. Likewise, all of the intermediate fingers 22 would be in contact with the convex tapered surface 25 of the reciprocal member 26. However, in the usual pipe being calipered, the inside surface 14 is not smooth or regular and therefore by reason of the construction of this tool, the feeler or feelers 11 which are moved furthest outward into contact with the pipe P would transmit through the concave tapered surface 23 of the reciprocal member 24 their movements the recording stylus 29 for making the record on the chart 16. The feeler or feelers 11 which are moved furthest inward would have its or their fingers 22 in contact with the convex tapered surface 25 of the reciprocal member 26 and would therefore transmit their movement to the stylus 36 for recording on the chart 16. Thus, at any given point in the pipe P, the feelers 11 which are the furthest outward and the furthest inward would transmit a record to the chart 16, with the other feelers being disengaged from the reciprocal members 24 and 26.

Since only the furthest outward feelers and the furthest inward feelers are recorded on the chart 16, there results only the two substantially parallel lines 16a and 16b thereon. By having such a record on the single chart 16, the true condition of the internal surface 14 of the pipe P is indicated. The feeler moved furthest inwardly which records the line 16b on the chart 16 may indicate scale deposits, cement, tong marks, welds, and the like, but in most instances it will indicate the original uncorroded I.D. of the pipe or the least corrosion thereof. With such a record of the least corrosion, therefore, it is possible to also locate ring corrosion and corrosion within collars such as are used for connecting together sections of well pipe. Without the feeler furthest inward being recorded on a comparative chart, the only record obtainable would be that of the feeler furthest outward and it would be necessary to assume that the pipe was of uniform inside diameter even after the pipe had been in service for a considerable length of time such as in well operations. It will be appreciated that such an assumption in many cases would be entirely erroneous and would fail to indicate the true condition of the pipe so that a pipe might be left in a well and thus fail due to such inaccurate information.

In the modification shown in Figure 2, the tool of this invention is substantially the same as that shown in Figure 1 with the exception of the construction of the convex reciprocating member 26 and the feelers 11. As can be seen in Figure 2, the tapered surface 25 of the reciprocal member 26 faces upwardly and the fingers 22 on the feelers 11 which engage such tapered surface 25 are therefore positioned thereabove. The operation of the tool shown in Figure 2 would be substantially identical with that of the tool shown in Figure 1, except that the reciprocal member 26 would move downwardly when urged by the furthest inward feeler instead of upwardly as would occur in the tool illustrated in Figure 1.

In the form of the tool shown in Figure 4, the feelers 11 are of similar construction to those shown in Figure 1, having the contact points 20 for the inside surface 14 of the pipe P. Also, these feelers have fingers 21 similar to those fingers 21 illustrated in Figure 1. However, it is desirable in this modification to provide fingers which will be resiliently urged into contact with the transmitting means 15. To this end, several forms are shown in Figures 7, 13 and 14. In Figure 7, the finger 21 has a recess 21a therein for receiving a spring 21b or any other suitable resilient means. Mounted above the spring 21b is a tip 21c which is slidable in the recess or groove 21a and is normally urged upwardly by the action of the spring 21b. In the form of the finger 21 shown in Figure 13, a cantilever arm 21d is pivoted through the pivot 21e to the main portion of the finger 21. This cantilever arm 21d is urged upwardly by action of the spring 21f. In Figure 14, there is illustrated another cantilever type finger 21 which has a resilient lateral arm 21g which is usually of flat spring metal to provide the desired resilience.

In Figure 4, the transmitting means 15 includes a resistance member 45 which has laterally spaced contact elements 46 of conducting material which are separated by electrical insulating material 47. These conductor elements 46 may take the form of spaced concentric rings as shown in Figure 5 to which are connected the resistance wires 45a, 45b, 45c and 45d. The central ring as shown in Figure 5 is directly connected to the wire 50 which is grounded to the housing 10. The wire 51 leading from the outside conductor element 46 leads to the battery 52 which supplies the potential for the electrical circuit. In the particular arrangement as shown in Figures 4 and 5, the feeler 11 moving furthest outwardly will determine the amount of resistance which is in the circuit. This is true since the fingers 21 are constantly in contact with the lower edges of the conductor elements 46 and since the feelers 11 are connected to the housing which serves as the ground, the circuit will be completed through the path of least resistance which would be established only by the feeler 11 through its finger 21 which contacted the furthest ring 46 outwardly.

Connected in series with the circuit which includes the variable resistance means 45, the battery 52 and the feelers 11, is a galvanometer 55 which has therewith a mirror 56 as is well known in the art. A source of light such as a light supplied with electricity from a dry cell battery is indicated at 57. The light is directed through two aligned openings 58 to form a light beam which impinges upon the mirror 56. Only one opening 58 is shown as such devices for forming light beams used in galvanometers are well known. As the mirror is caused to change its position by the change in current supplied to the galvanometer 55, the direction of the reflected light from the mirror 56 will be changed as is well known. The reflected light from the mirror 56 is directed to the inside of the rotatable chart 16 which has therein a light sensitive sheet on which the record is obtained. The galvanometer 55 and the light source 57 are constantly moved longitudinally by rotation of the rod 59 during the longitudinal movement of the tool within the pipe P. This rotation can be imparted from a clock drive or if desired by contact of a wheel with the pipe such as is used for driving the chart as disclosed in the above identified U.S. Patent No. 2,665,187. The rotation of the shaft or rod 59 is imparted to rotate the chart 16 through the beveled gear connection 60. As can be seen, roller bearings would ordinarily be provided as at 61 to support the chart 16 for rotation. When the chart 16 rotates, the galvanometer 55 and light 57 are moved only longitudinally. In some instances, it may be desirable to also rotate the galvanometer 55 and the light source 57 and move them longitudinally while keeping the chart 16 stationary. This will also produce a helical record on the chart 16. If such motion is desired, the galvanometer 55 and light source 57 could be helically moved on the threaded rod 59 by rotation thereof in threads fixed to the housing 10. This would eliminate the gears 60.

In the operation of the device shown in Figure 4, the housing 10 would be moved longitudinally through the pipe P and the furthest outward feeler 11 would establish a circuit and determine the amount of resistance in that circuit, such circuit being supplied with a potential from the battery 52. Since the galvanometer 55 is connected in series with the variable resistance circuit, the current to the galvanometer will be changed depending upon the resistance in that circuit. Thus, the movement of the furthest outward feeler will control the record obtained on the chart 16. In some instances, it may be desirable to measure the least corroded surface on the inside of pipe P, such being accomplished by changing the connection of the lines or leads 51 and 50, so that the lead 50 to the central ring is connected to the battery and the lead 51 is grounded to the housing 10. With such a connection only, the finger 21 which moves furthest inward would determine the least resistance and would thus control the record obtained on the chart 16.

As an alternative to the variable resistance member 45 illustrated in Figures 4 and 5, the spiral resistance 45' in which each turn of a spiral resistance material is separated from the next by insulating material 47, as is illustrated in Figure 6 may be used. When using resistance 45', the lead 51 will be connected to the inner end of the spiral 45' with the outer end of the spiral 45' being connected to the wire 50. With such a connection, the finger furthest inward would be the determining member for the amount of the spiral used as the resistance and would therefore be the factor determining the record obtained on the chart 16. It will be appreciated of course that if the wires 50 and 51 are reversed the outermost feeler will then be the controlling finger and will transmit the record of its movement.

Since the tool of this invention is designed to operate in wells where conducting fluids such as salt water are frequently present, it is best to provide a separation sheet such as the diaphragm or glove 62 shown in Figures 4 and 7. This diaphragm 62 has opening 62a therein for the passage therethrough of the fingers 21. The diaphragm or glove 62 is constructed of a resilient or elastic material such as rubber or a synthetic resin. It is preferable to have an enlarged portion 62b at the opening 62a to provide for additional strength and to prevent tearing of the glove 62 as the fingers 21 move laterally. This glove 62 may be sealed to the housing 10 by any suitable means such as the screws and washers 64 and may be used with any of the forms of the fingers 21 shown in Figures 7, 13 and 14. Above the glove 62 it may be desirable to have a non-conducting fluid such as transformer oil to provide additional protection against the entrance of conducting or corrosive fluids which might short out or damage the electrical contacts between the fingers 21 and the conductor members 46.

In the form of the invention shown in Figure 8, the construction is substantially identical to that of Figure 4 with the exception of the transmitting means 15 and the chart recorder means 16. In the tool of Figure 8 the chart 16 is positioned at the surface, as well as the galvanometers 55 with their associated mirrors 56 and light sources 57, the light from the light sources 57 passing through two small aligned openings 58 of a protective shield diagrammatically shown in the same manner as in the modification of Figure 4. The galvanometer and light source are well known and as such form no part of this invention. In the tool of Figure 8 a double conductor cable having leads 65 and 66 is passed downwardly through an opening in the housing 10. Two circuits are thus formed with one leg of each circuit being the ground line 67 and 67a connected to the housing 10. One of the circuits has a source of electricity 69, and the other has a source of electrical current 70. As shown in Figure 8, one of the circuits would include the source of alternating current 69, the lead 66, the furthest inward feeler 11, and the ground 67. The other circuit would include the source of direct current 70, the wire 65, the furthest outward feeler 11 and the ground 67. It will be appreciated that although the current sources 69 and 70 are shown as alternating and direct current sources, in some cases it may be desirable to provide two alternating current sources or two direct current sources so that they would supply the separate potentials for the two circuits. Thus, using the methods outlined above, it is possible with this construction to indicate the movements of the furthest inward feeler and the furthest outward feeler on one record and to obtain such record on a chart such as 16 which would have thereon a light sensitive material for making the record. Thus, the embodiment of Figure 8 obtains the same record as that of the form shown in Figure 1.

It is also possible to have a circuit utilizing only a single conductor cable 75 passing downwardly through the housing 10 to the variable resistance member 45, which will indicate both the furthest inward and the furthest outward movement of the feelers 11 by using a filter 76 which includes coil and condenser in the conventional arrangement, such filter being connected as shown in Figure 9 to the mutually filterable potential sources 69 and 70. While A.C. and D.C. sources are shown in Figure 9, there might be used two different frequency A.C. sources instead. This single cable 75 would have connected therewith in proximity to the variable resistance member 45 leads such as 65 and 66 shown in Figure 8, whereby a record may be obtained of both the furthest inward and the furthest outward feeler.

It should be pointed out in connection with Figures 4 and 8 that it is possible to record a single record line which indicates the difference in displacement between the furthest inward and the furthest outward feelers 11. In Figure 4, for example, the ground connection 50 could be eliminated. The ground connection 52a could also be disconnected from the housing and led directly to the central ring 46 of the resistance member 45. The feelers 11 would be grounded to the housing 10. With such an arrangement, the complete electrical circuit would include the galvanometer 55, battery 52 and resistance element 45 with the amount of resistance being that which is not shorted out by the furthest inward feeler 11 and the furthest outward feeler 11. Thus, the record obtained on chart 16 will be a single line indicating the result of a difference between the furthest inward and the furthest outward feelers 11. The same type of indication could be obtained at the surface by using an arrangement such as shown in Figure 8 with the ground lines 67, 67a eliminated. Only one potential source 69 or 70 would be used and the record would be made on a single chart. The circuit in Figure 8 would thus be substantially the same as described for Figure 4, with the record being made at the surface in Figure 8.

It will be understood that an actual practice, the electrical circuits disclosed in their various forms may require resistors, condensers, amplifiers, and the like, which are not shown, for more efficient operation and that the circuits disclosed are reduced to their simplest form in order to reveal the elements of the invention.

It should be understood in connection with the modification shown in Figures 4, 5, 6 and 8 that the conductor and insulator elements 46 and 47, as illustrated therein, are substantially larger than would normally be used. In actual construction, these conductor members 46 and resistance member 45' and the insulating material 47 would be thin and would therefore require more resistors than 45a–45d which are shown in the illustration of Figure 5.

An alternate embodiment of this device would be to substitute a rheostat for contact with each stylus, after the teaching of the aforementioned United States Patent No. 2,638,681, whereby one rheostat would respond to the furthest outward moving feeler, while another would respond to the feeler furthest inward. Each rheostat would then operate a recorder such as that shown in Figure 4 or Figure 8, previously described, or commercially available recorders of like character.

In the modification shown in Figures 10–12, the feelers 11 can be mounted on a band 18 or initially formed integrally therewith as best shown in Figures 10 and 11. It will be appreciated, of course, that the fingers could, if desired, in the form shown in Figure 10, be separate as illustrated in the other figures and that the fingers could be integral in any of Figures 1, 2, 4 and 8. The contact portion 20 of the feelers 11, as shown in Figure 10, have inserts 77 which are provided to improve the wearing characteristics of the contact portions 20. Such inserts, of course, could be used in any form or in any of the other forms of this invention. These inserts may be of tungsten carbide or similar hard-wearing material and could even be a coating of such hard-wearing material on the feelers in proximity to the contact portions 20. In this form of the invention the transmitting means comprises strain gages 80, one of which is attached to each feeler arm 11a. Since in the lateral movement of the feelers 11, the compression in the inner surface of the arms 11a is varied, this variation in the compression will be transmitted to the strain gages 80. These strain gages 80 are connected through suitable leads 81 and 82 to a recording mechanism, of the type shown in either Figure 4 or Figure 8. The strain gage 80 is the variable resistance means in the circuit and each gage 80 will usually have a separate galvanometer 55 therewith. Thus, there will be either a multi-conductor cable or a single cable employing multi-frequencies, and each finger 11 will be represented by a separate line on the chart which line will vary in deflection as the resistance in its gage 80 varies. Preferably these separate lines are substantially superimposed on the same chart or recording means to obtain a record path such as 16a illustrated in Figure 17, whereby the lines representing the furthest outward feeler and the furthest inward feeler will be readily apparent even though the lines representing the feelers between those extreme positions may be so close as to be indistinguishable. This is true since the line on the chart representing the furthest outward feeler will have the greatest deflection while the line representing the furthest inward feeler will have the least deflection and the other lines for the other feelers will appear somewhere therebetween. The recorder chart for the Figure 10 tool could be either within the tool, as shown in Figure 4, or could be at the surface, as shown in Figure 8. It should also be understood in connection with Figures 4 and 8 that the recording chart construction shown in either of these figures could be utilized in the other, so that employing the circuit of Figure 4, the chart could be positioned at the surface, while employing the circuit of Figure 8 the chart 16 could be positioned within the housing 10, as shown in Figure 4. Also, instead of the strain gages 80, a separate rheostat could be operated by each feeler 11 with connection in accordance with the above mentioned United States Patent No. 2,638,681.

In the modification of the calipering tool illustrated in Figures 15–17, the feelers 11 are spaced circumferentially and axially from each other. Each feeler 11 is pivoted to the support housing 10 at pivot 11b with the contact portion 20 projecting through the opening 12 in the housing 10 to contact the inside of the well pipe P. The arm 11a of each feeler 11 is preferably extended inwardly from the pivot 11a at substantially a perpendicular to the contact portion 20. The spring or other resilient means 85 is attached to the inner end of the arm 11a and to the housing 10 through an inwardly extending bracket 86 secured thereto, whereby each feeler 11 is urged outwardly on its pivot 11b so that the contact portion 20 constantly engages the pipe P.

It will be appreciated that the above described feeler arrangement of Figures 15–17 wherein the feelers 11 are spaced circumferentially and axially could be utilized with other forms of the transmitting means 15 and recorder means 16 than the ones illustrated in Figure 15. For example, each feeler could have contact member adapted to contact a resistance plate such as shown in Figure 5, but in order to get a separate indication for each feeler the resistance plate should be composed of radial variable resistors separated by insulation, with one radial variable resistor for each feeler contact and a separate galvanometer 55 for each feeler.

In Figures 15 and 16, the transmitting means 15 for each feeler 11 includes a link 87 having one end thereof pivotally connected to the inner end of the arm 11a and its other end pivotally connected to a substantially vertical stylus rod 88. Each stylus rod is maintained in vertical alignment by plates 89 and 90 near its upper and lower ends, respectively, in which bushings 89a and 90a are provided for wear and sealing purposes.

At the upper end of each rod 88 is the stylus or needle 91 which is adapted to trace a line on the chart or recorder means 16 in accordance with the surface variations on the inside of the pipe P. These styluses 91 are preferably all grouped as close together radially as possible so as to reduce the length of chart 16. To this end, the links 87 may be twisted or bent as at 87a so that even though the feelers 11 extend around the entire periphery or circumference of the housing 10, the styluses 91 may be grouped on one side of the chart as best seen in Figure 16. Of course, if desired, the styluses could extend around the entire outer periphery of the chart 16 corresponding to the location of the feelers 11, but in that event, the length of chart 16 would be considerably increased or the scale of record lines decreased.

The chart 16 of this form is shown as being operated in accordance with the chart drive means illustrated in U.S. Patent No. 2,665,187, above referred to in connection with Figure 1. In that patent, however, the stylus moved axially or longitudinally while the chart rotated whereas in Figure 15 as in Figure 1 of this invention, it is generally preferable to move the chart 16 axially or longitudinally as well as in rotation, while the styluses 91 move axially or longitudinally only due to variations in the inside surface of the pipe.

As seen in Figure 15, the contact roller 92 is mounted in the housing 10 and engages with the inside surface of pipe P so that such roller 92 rotates as the tool is moved axially or longitudinally in the pipe P. The movement of the roller 92 is imparted to a square shaft 93 through gears 94 and 95 which drive bevel gear 96 and bevel gear 97 connected to the shaft 93. The shaft 93 is slidable in the chart 16 and coacts with a square opening therein and its lower end is mounted in a bushing or bearing 98 seated in the lower plate 90. Axial movement of the chart 16 is effected during rotation thereof by the engagement of exterior threads 99 on the top of the chart 16 with interior threads 100 within a sleeve or nut 101 fixed to the housing 10 by welding or any suitable securing means.

In the operation of the device of Figures 15 and 16, the housing 10 is preferably moved upwardly in the pipe P, thereby causing the chart 16 to be rotated and moved upwardly through the gear drive associated with roller 92. The record path 16a obtained is actually a helical record having the same pitch as the threads 99 and 100 and is composed of a plurality of lines, one line for each stylus 91 and its corresponding feeler 11. These styluses 91 are preferably spaced axially a small amount corresponding to the axial spacing of the feelers with which they are connected so that the styluses 91 are in a helical path of the same pitch as the pitch of the threads 99 and 100; i.e., the helical path of the movement of the chart 16. Thus, the highest feeler 11 will have the highest stylus, but it will be appreciated that the axial spacing of the styluses 91 is small as compared to the axial spacing of the feelers 11.

Although each feeler 11 of the Figure 15 device reaches a particular plane at a different time during the axial movement of the tool in the well pipe P, the indications for that plane will be indicated at the same point on the chart. For example, assume that the deflection 16b on the record path 16a as shown in Figure 17 indicates a collar in the pipe P. As the upper feeler 11 hits that collar it will make its stylus 91 deflect. During the time that it takes for the next highest stylus to reach the collar, the chart 16 rotates so that the second highest stylus 91 is at the same point on the chart as that at which the deflection 16b was made for the highest feeler 11; thus, the deflection for the particular collar, as well as any other surface variation on the pipe P, will be indicated at the same point on the chart for each feeler 11. It will be appreciated, of course, that since the feelers 11 are spaced circumferentially also, there may be a difference in the amount of deflection of each stylus at a particular plane in the pipe due to differences in corrosion, etc., in that plane, but in any event, the feeler which moves furthest outward at a particular lateral plane shows the greatest deflection whereas the feeler which is furthest inward shows the least deflection, and the feelers in between are substantially superimposed or indistinguishable when the styluses 91 are in a helical path as above described.

Of course, the styluses 91 can be placed in the same horizontal plane rather than in a helical path corresponding to the helical movement of the chart 16, or in any axially spaced arrangement other than the chart's helical path. This would separate the lines made for each stylus for an individual examination thereof. Although the furthest outward and the furthest inward feeler could still be determined, such information would not be as readily apparent as when the lines are formed as shown in Figure 17 by having the styluses 91 in the same helical path as that of the movement of the chart 16.

It should be understood that the rods 88 and related structure transmitting the feeler movement to the styluses in Figure 15 may be varied within the skill of the art. For example wires under tension could be used in place of the rods 88 and links 87 or an electrical transmission through strain gages as in Figure 10, or rheostats as previously mentioned in connection with Figure 10, could be utilized. It will also be apparent that the gearing between the roller 92 and the shaft 93 can be changed so that the chart 16 will move either upwardly or downwardly while the tool is run either upwardly or downwardly in the pipe P. For example, to run the chart 16 downwardly while the housing 10 moves upwardly in the pipe P, such result can be effected by placing an idler gear (not shown) between gears 94 and 95 or by reversing the pitch of the threads 99 and 100, or by any other suitable change. If the chart 16 is moved downwardly, obviously the styluses 91 would be started at the bottom thereof.

From the above it is believed evident that the tool of this invention in its several forms illustrates constructions adapted to measure the surface variations in a well pipe by measuring the movement of the furthest inward feeler and the furthest outward feeler, and additionally, it illustrates devices wherein the movement of the furthest outward feeler, or the furthest inward feeler, or the difference between them, can be recorded by an electrical circuit means.

The foregoing disclosure and description of the invention is illustrative and explanatory thereof, and various changes in the size, shape and materials, as well as in the details of the illustrated construction may be made, within the scope of the appended claims, without departing from the spirit of the invention.

What is claimed is:

1. In a device for locating surface variations in a well pipe, a support means, a plurality of circumferentially spaced feelers mounted on said support means for lateral displacement as said feelers contact surface variations on the inside surface of the well pipe, means for moving said device longitudinally in the well pipe, transmitting means within said device for responding to the movement of both the feeler displaced furthest outward and the feeler displaced furthest inward in each lateral plane traversed by said device during its longitudinal movement in the well pipe, and a recorder means associated with said transmitting means for recording both such furthest outward and inward movement in each plane traversed by said device, said transmitting means including a variable electrical resistance means having a single resistance which is varied by both the furthest inward and the furthest outward feeler.

2. In an instrument for measuring surface variations in the inside wall of pipe, the combination comprising, a multiplicity of circumferentially spaced feelers each independently movable laterally, a singe variable resistance means mounted in said tool for contact by a portion of each of said feelers, two electrical circuits including said resistance means, a source of electrical potential connected to said resistance means, the furthest outward feeler alone completing one of said circuits, and the furthest inward feeler alone completing the other of said circuits.

3. In an instrument for measuring surface variations in the inside wall of a pipe, the combination comprising, a multiplicity of circumferentially spaced feelers each independently movable laterally, a single variable resistance means mounted in said tool for contact by a portion of each of said feelers, two electrical circuits including said resistance means, a source of electrical potential connected to said resistance means, the furthest outward feeler completing one of said circuits, the furthest inward feeler completing the other of said circuits, and a recording means in each of said two circuits whereby a record of the furthest inward feeler and the furthest outward feeler is obtained as an indication of the surface variations in the pipe.

4. In a device for indicating contour variations in a pipe, a support means, a plurality of spaced feelers mounted on said support means for radial displacement as said feelers encounter contour variations on the inside surface of the pipe, transmitting means including an electrical circuit having a variable electrical resistance means engageable by the feeler displaced furthest outward and the feeler displaced least outward in each lateral plane traversed by said device in said pipe for varying the amount of the resistance in the electrical circuit in accordance with the difference between the radial displacement of said feeler displaced furthest outward and the feeler displaced least outward in each lateral plane traversed by said device, and a recorder means associated with said transmitting means for recording the difference between the radial displacement of said feeler displaced furthest outward and said feeler displaced least outward in each lateral plane traversed by said device.

References Cited in the file of this patent

UNITED STATES PATENTS

| 2,630,632 | Brandon | Mar. 10, 1953 |
| 2,638,681 | Kinley et al. | May 19, 1953 |
| 2,640,271 | Boucher | June 2, 1953 |
| 2,656,613 | Goble | Oct. 27, 1953 |
| 2,695,456 | Roberts | Nov. 30, 1954 |
| 2,771,685 | Kinley | Nov. 27, 1956 |